United States Patent Office 3,549,302
Patented Dec. 22, 1970

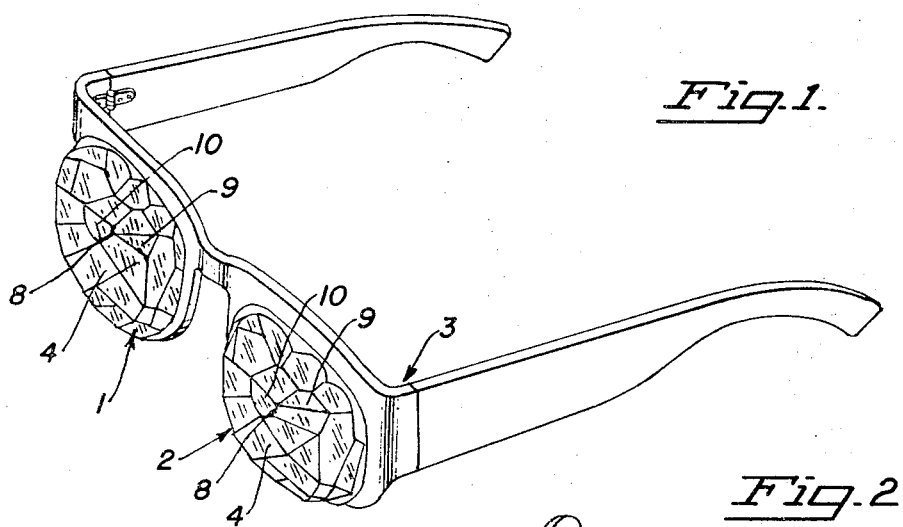
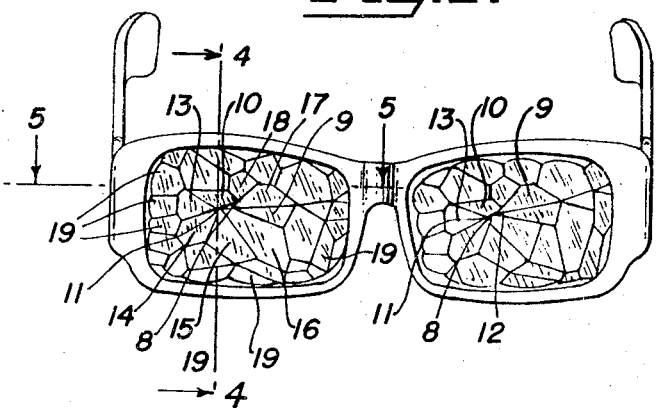
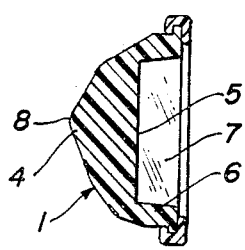
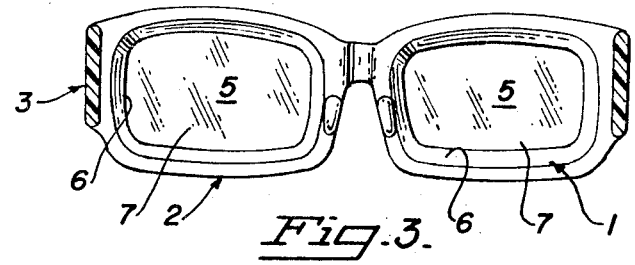
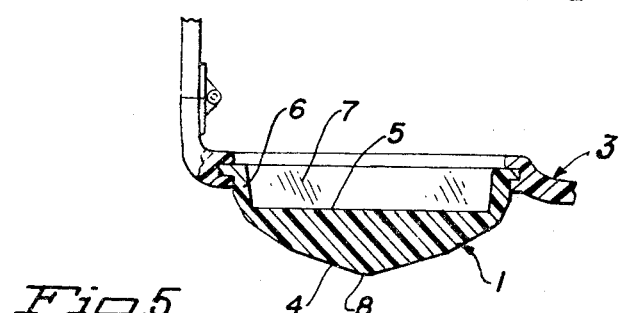

3,549,302
IMAGE DISSECTING AND MODIFYING LENSES FOR SPECTACLES
Richard Fraige, Alameda, Calif., assignor to C & F Products, Inc., San Francisco, Calif., a corporation of California
Filed Mar. 26, 1968, Ser. No. 716,031
The portion of the term of the patent subsequent to Dec. 3, 1982, has been disclaimed
Int. Cl. G02b 25/00
U.S. Cl. 350—146      4 Claims

ABSTRACT OF THE DISCLOSURE

A lens for the right eye and a lens for the left eye in a spectacle frame; the lenses are formed of clear or color-tinted, transparent material such as Lucite. The outside face of each lens is formed with 21 primary facets converging toward one another. The facets are of a variety of shapes so that each facet reproduces its own image and each image is refracted in such a way that several images are seen simultaneously, depending on the viewing position of the object, and thereby a kaleidoscopic effect is produced.

BRIEF DESCRIPTION OF THE INVENTION

Previously spectacle lenses in the art had increasing or varying dioptric curvature on bifocal or multifocal lenses, also stereoscopic lenses were adjustable separately for viewing stereoscopic pairs of pictures so as to create a depth or third dimension. In the herein invention a multiplicity of overlapping refracted images are produced so as to vary in accordance with the position of the object and according to the direction in which the eye is turned. This kaleidoscopic effect is accomplished by providing the lens with a number of facets of various shapes and angles arranged so that the adjacent facets are at suitable angles to one another and are grouped about the center or apex of the lens thereby to refract individual images through said facets in overlapping relation.

DESCRIPTION OF FIGURES

FIG. 1 is a perspective view of a spectacle with a multiple-faceted lens for each eye.
FIG. 2 is a front view of the spectacle with said lenses.
FIG. 3 is a rear view from the viewing side of the spectacle with the lenses partly in section.
FIG. 4 is a sectional view of one of the lenses with the section being taken on lines 4—4 of FIG. 2.
FIG. 5 is a sectional view of one of the lenses, the section being taken on lines 5—5 of FIG. 2.

DETAILED DESCRIPTION

A right lens 1 and a left lens 2 are suitably framed in a spectacle frame 3. Each lens is made of clear or color-tinted, transparent material, for instance, molded Lucite. Each lens has a convex outside or front face 4 and a flat viewing face 5 adjacent the eye. The flat viewing face 5 is surrounded by a flange 6 which extends around the entire periphery of the lens so as to form a recess 7 at the flat face 5. The flange 6 is of such depth that when the lens is mounted in the usual frame 3 then it locates the flat viewing face 5 of each lens approximately ten mm. from the viewing eye.

The convexity of the convex face 4 of each lens is such that the apex or approximate center 8 of each lens is approximately twelve mm. from the flat face 5. Thus the convex face 4 of each lens is about twelve mm. thick at the apex 8 and it converges toward the flat face 5 toward the respective peripheral edges of the lens all around.

There are about twenty-one primary facets formed on the convex face 4 adjacent to one another, each facet being inclined and converging away from the apex and toward the flat face at different angles, but generally toward the respective edges of the lens.

In the illustrative embodiment herein there are a pair of narrow triangular prismatic facets 9 and 10 extending away from the apex in opposite directions. The rounded base 11 of the triangular 10 is at the apex 8 and an angle or point 12 of the facet 9 is at the apex 8. Another generally triangular facet 13 has its point at the apex 8 and its base spaced from the apex 8 and lying alongside the facet 10. Between the triangular facets are a plurality of irregular substantially trapezoidal facets 14, 15, 16, 17 and 18 so as to cluster around the apex 8 but their planes converge outwardly toward the outer edges of the flat face 5 toward the periphery of the lens. The space between the peripheral edge of each lens and the central cluster of facets contains various sizes of facets 19 of various polygonal outlines.

The individual facets, for instance facet 17, incline in two directions so that the facets lie in irregular intersecting planes thereby to refract the images in different directions and at different intersecting angles.

The result is that the viewer receives several overlapping images simultaneously from several directions creating a kaleidoscopic-like design. Being that the lenses for the right and the left eye are identical in this illustration, a third dimensional effect is also achieved. As the head is turned, or the eyes are turned, or the object moves, the design of the overlapping images changes as the respective images are refracted in different directions and modified differently.

I claim:
1. In an image dissecting and modifying spectacle, the combination with a spectacle frame,
   (a) a lens of transparent material for each eye secured in said frame,
   (b) a plurality of facets, in different adjacent intersecting planes, at different intersecting angles on at least one face of each lens,
   (c) said facets being a variety of shapes, different from one another whereby said lenses refract several different overlapping images,
   (d) the said facets being grouped about the center of each lens so as to result in different thicknesses between the center of the lens and the periphery of the lens, and being so located in said frame that the respective facets on the lenses for both eyes refract the images substantially identically, the two lenses being held in fixed relation to one another by said spectacle frame and the group facets on the two lenses being held symmetrically.
2. The invention defined in claim 1, wherein said lens is the thickest at said apex and is reduced in thickness toward the periphery of the lens.
3. The invention defined in claim 1, wherein the other face of each lens is flat.
4. The invention defined in claim 1 and
   (e) said lens being the thickest at said apex and said facets converging toward the periphery of the lens,

(f) the face of each lens adjacent the eye being flat and being recessed for spacing from the eye, and
(g) said spectacle frame supporting said lens so that the recessed flat sides of the lens are toward the viewer.

References Cited

UNITED STATES PATENTS

| | | | |
|---|---|---|---|
| 1,501,979 | 7/1924 | Willson | 350—189 |
| 1,696,431 | 12/1928 | Crockett | 350—213 |
| 2,200,466 | 5/1940 | Cristiani et al. | 350—189 |
| 2,953,980 | 9/1960 | Montebello | 350—130 |
| 3,100,418 | 8/1963 | Posner | 350—204 |
| D.212,864 | 12/1968 | Fraige | D57—1 |

FOREIGN PATENTS

| | | | |
|---|---|---|---|
| 395 | 1888 | Great Britain | 350—193 |
| 7,695 | 1900 | Great Britain | 350—189 |

DAVID SCHONBERG, Primary Examiner

P. A. SACHER, Assistant Examiner

U.S. Cl. X.R.

350—193